(12) United States Patent
Castellano (10) Patent No.: US 10,219,552 B2
(45) Date of Patent: Mar. 5, 2019

(54) SOUND RESPONSIVE GARMENT (71) Applicant: John Castellano, Bronx, NY (US)

(72) Inventor: John Castellano, Bronx, NY (US)

(*) Notice: Subject to any disclaimer, the term of this patent is extended or adjusted under 35 U.S.C. 154(b) by 232 days.

(21) Appl. No.: 15/286,726

(22) Filed: Oct. 6, 2016

(65) Prior Publication Data

US 2018/0098580 A1  Apr. 12, 2018

(51) Int. Cl.
| | |
|---|---|
| *A41D 1/00* | (2018.01) |
| *H02J 7/35* | (2006.01) |
| *H02J 7/02* | (2016.01) |
| *A41D 27/08* | (2006.01) |
| *A63B 24/00* | (2006.01) |
| *H04R 1/02* | (2006.01) |
| *H04R 29/00* | (2006.01) |
| *F21Y 115/10* | (2016.01) |

(52) U.S. Cl.
CPC ............ *A41D 1/005* (2013.01); *A41D 27/085* (2013.01); *A63B 24/00* (2013.01); *H02J 7/025* (2013.01); *H02J 7/35* (2013.01); *H04R 1/028* (2013.01); *H04R 29/008* (2013.01); *F21Y 2115/10* (2016.08); *H04R 2201/023* (2013.01)

(58) Field of Classification Search
CPC ....... A41D 1/005; A41D 27/085; H02J 7/025; H02J 7/35; H04R 1/028; H04R 29/008
USPC .......................................... 2/102, 85, 94, 95
See application file for complete search history.

(56) References Cited

U.S. PATENT DOCUMENTS

| | | | | |
|---|---|---|---|---|
| 4,589,134 A | * | 5/1986 | Waldron ................. | H04R 5/02 381/301 |
| 4,602,191 A | * | 7/1986 | Davila ................. | A41D 27/085 315/312 |
| 4,709,307 A | * | 11/1987 | Branom ............... | A41D 27/085 362/103 |
| 4,876,724 A | * | 10/1989 | Suzuki .................. | H04R 5/023 381/385 |
| 5,563,951 A | * | 10/1996 | Wang .................... | G02C 11/06 381/301 |
| 5,565,840 A | | 10/1996 | Thorner et al. | |
| D411,576 S | | 6/1999 | Hames | |
| 6,193,678 B1 | | 2/2001 | Brannon | |
| 6,324,053 B1 | * | 11/2001 | Kamijo .................. | G06F 1/163 2/264 |
| 6,370,692 B1 | * | 4/2002 | Duyn ....................... | A41D 3/02 2/86 |
| 6,563,424 B1 | * | 5/2003 | Kaario .................... | G06F 1/163 340/572.1 |
| 6,818,816 B2 | | 11/2004 | Roberts et al. | |
| 6,819,771 B2 | | 11/2004 | Menzies | |
| 6,906,472 B2 | | 6/2005 | Wong | |

(Continued)

*Primary Examiner* — Gloria Hale (57) ABSTRACT

A sound responsive garment for synchronized output of sound, light and vibration includes a shell. A power module is coupled to the shell. A microprocessor is coupled to the shell and operationally coupled to the power module. A plurality of speakers, a plurality of lights and a plurality of vibrators are coupled to shell and operationally coupled to the microprocessor. An input is operationally coupled to the microprocessor. The input is configured to couple to an audio source such that an audio signal from the audio source is relayed to the microprocessor. The speakers are positioned to emit the audio signal. The lights and the vibrators are motivated by the microprocessor to emit light and vibrations, respectively, timed to the audio signal.

20 Claims, 6 Drawing Sheets

(56) References Cited

U.S. PATENT DOCUMENTS

| | | | | |
|---|---|---|---|---|
| 7,519,792 | B2* | 4/2009 | Koufaty | G06F 12/145 |
| | | | | 711/210 |
| 8,642,873 | B2 | 2/2014 | Liotta | |
| 8,687,834 | B2 | 4/2014 | Wolfe | |
| 2004/0099130 | A1* | 5/2004 | Roberts | A41D 1/005 |
| | | | | 84/723 |
| 2004/0128747 | A1* | 7/2004 | Bumbarger | A41D 13/0053 |
| | | | | 2/458 |
| 2005/0125874 | A1* | 6/2005 | DeVore | A41D 13/01 |
| | | | | 2/69 |
| 2006/0113336 | A1* | 6/2006 | Spencer | A45F 3/20 |
| | | | | 224/148.2 |
| 2006/0182297 | A1* | 8/2006 | Cyr | A41D 1/005 |
| | | | | 381/333 |
| 2006/0260020 | A1* | 11/2006 | Seguin | A41D 13/00 |
| | | | | 2/93 |
| 2011/0070957 | A1* | 3/2011 | Ball | B60K 17/22 |
| | | | | 464/180 |
| 2014/0112521 | A1* | 4/2014 | Wolfe | H04R 1/1033 |
| | | | | 381/384 |
| 2014/0191706 | A1* | 7/2014 | Maese | H02J 7/0042 |
| | | | | 320/103 |
| 2016/0100641 | A1* | 4/2016 | Payne | A41D 27/085 |
| | | | | 381/333 |
| 2016/0144775 | A1* | 5/2016 | Ejiawoko | A41D 13/01 |
| | | | | 340/465 |
| 2016/0209016 | A1* | 7/2016 | Bernstein | F21V 23/0407 |
| 2016/0302501 | A1* | 10/2016 | Peterson | A41D 27/20 |
| 2016/0374421 | A1* | 12/2016 | Washington | A42B 1/245 |
| | | | | 2/84 |

* cited by examiner

SOUND RESPONSIVE GARMENT

BACKGROUND OF THE DISCLOSURE

Field of the Disclosure

The disclosure relates to responsive garments and more particularly pertains to a new responsive garment for synchronized output of sound, light and vibration.

SUMMARY OF THE DISCLOSURE

An embodiment of the disclosure meets the needs presented above by generally comprising a shell. A power module is coupled to the shell. A microprocessor is coupled to the shell and operationally coupled to the power module. A plurality of speakers, a plurality of lights and a plurality of vibrators are coupled to shell and operationally coupled to the microprocessor. An input is operationally coupled to the microprocessor. The input is configured to couple to an audio source such that an audio signal from the audio source is relayed to the microprocessor. The speakers are positioned to emit the audio signal. The lights and the vibrators are motivated by the microprocessor to emit light and vibrations, respectively, timed to the audio signal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
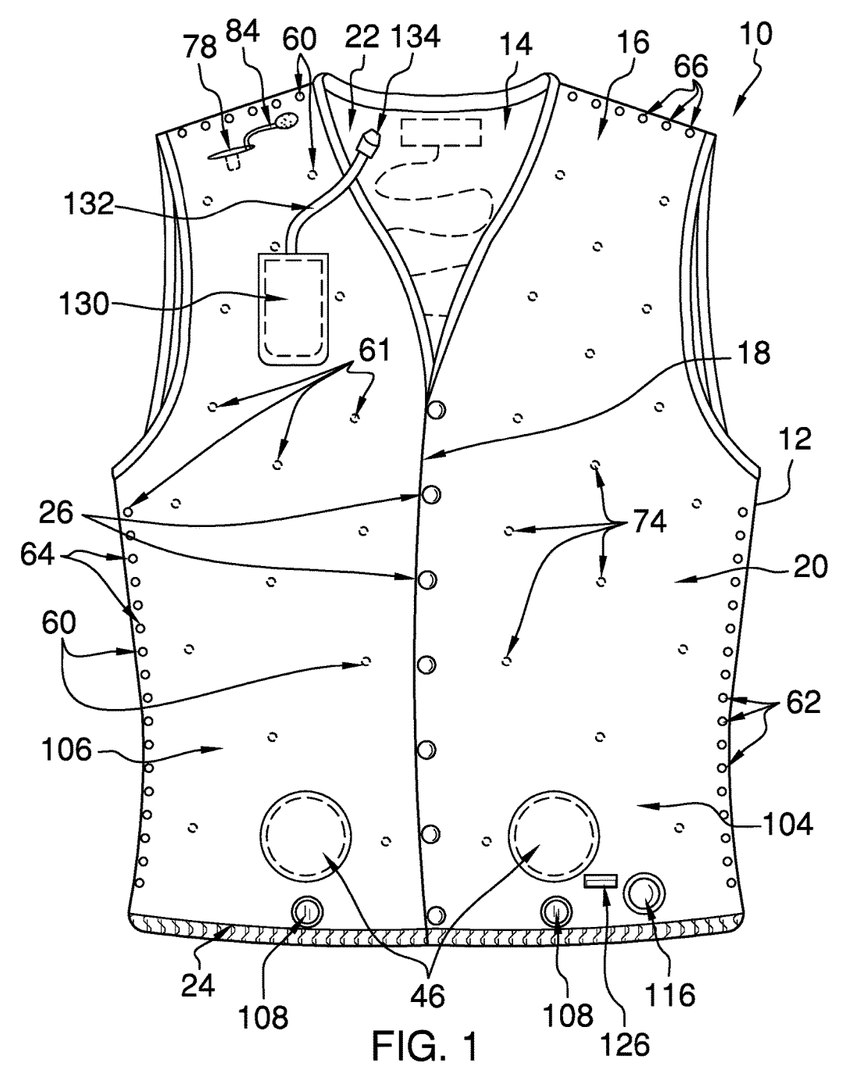
FIG. 1 is a front view of a sound responsive garment according to an embodiment of the disclosure.
Figure 2:
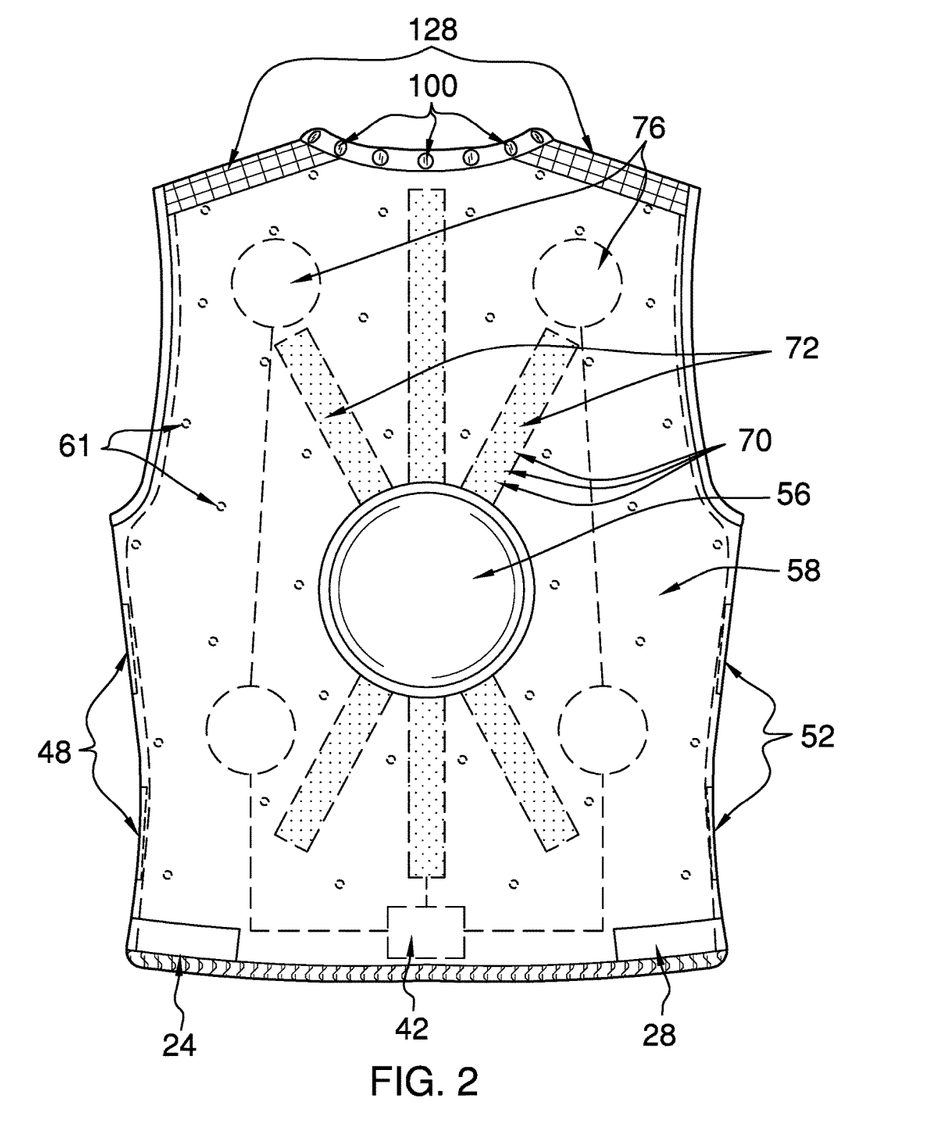
FIG. 2 is a back view of an embodiment of the disclosure.
Figure 3:
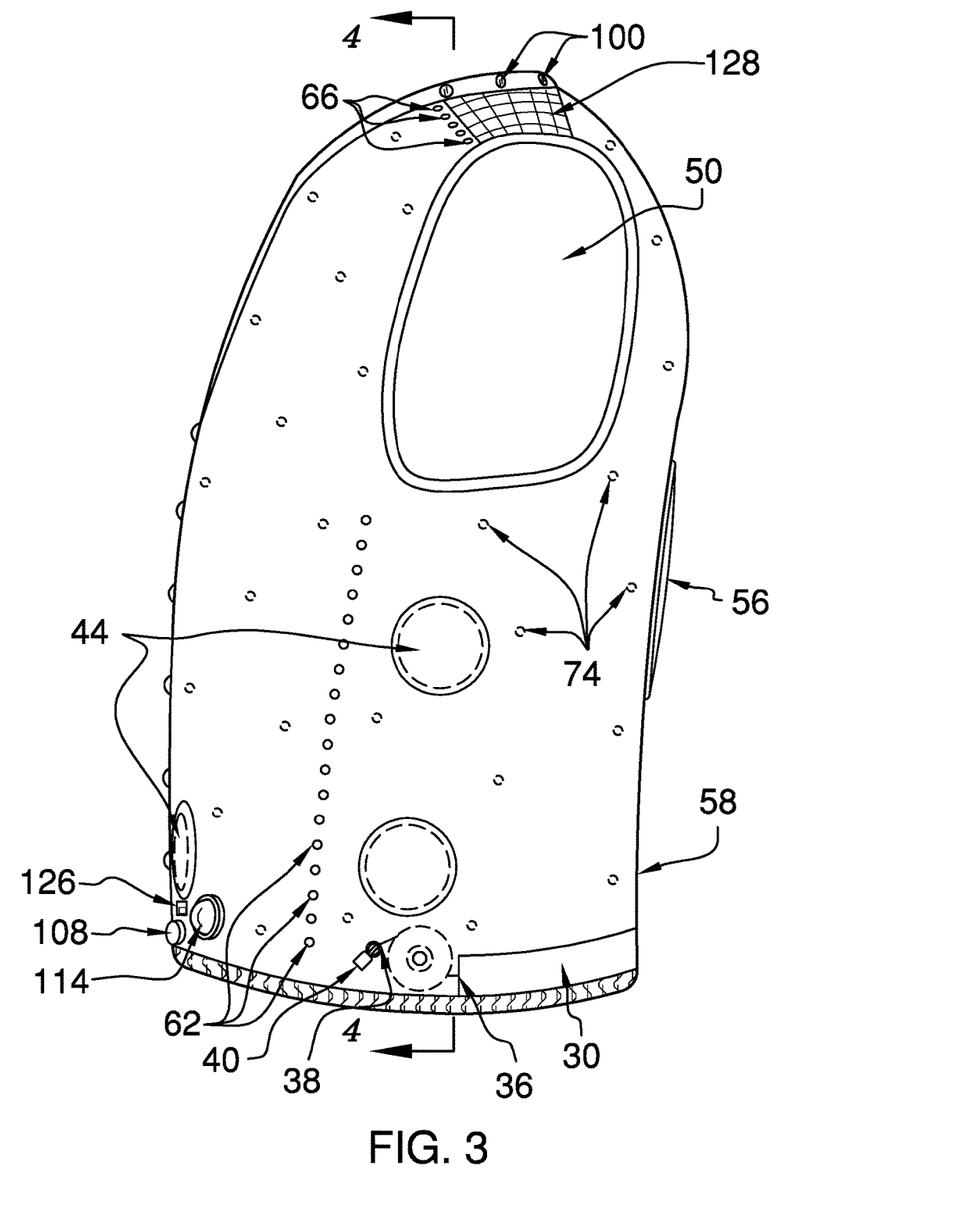
FIG. 3 is a side view of an embodiment of the disclosure.
Figure 4:
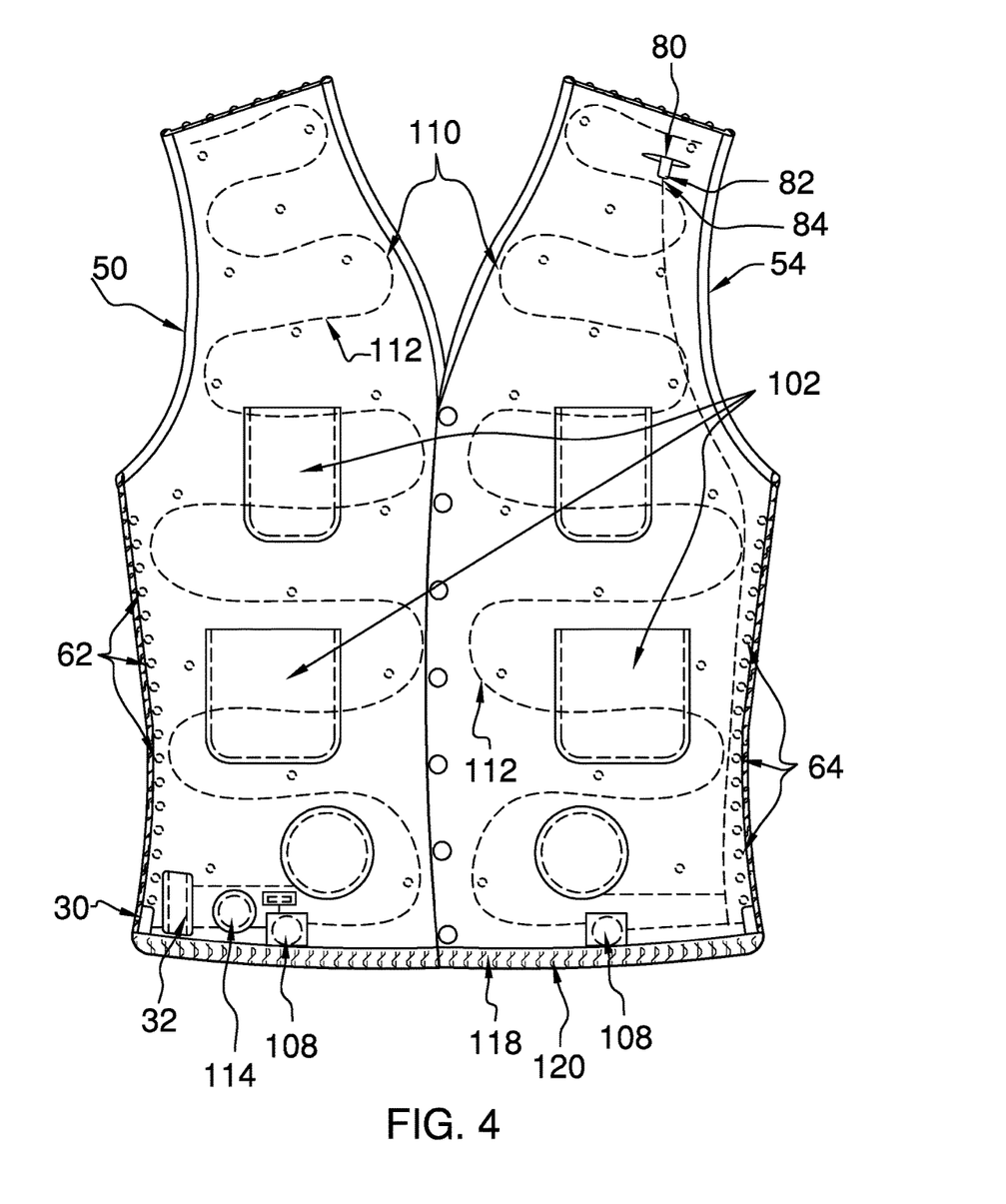
FIG. 4 is a cross-sectional view of an embodiment of the disclosure.
Figure 5:
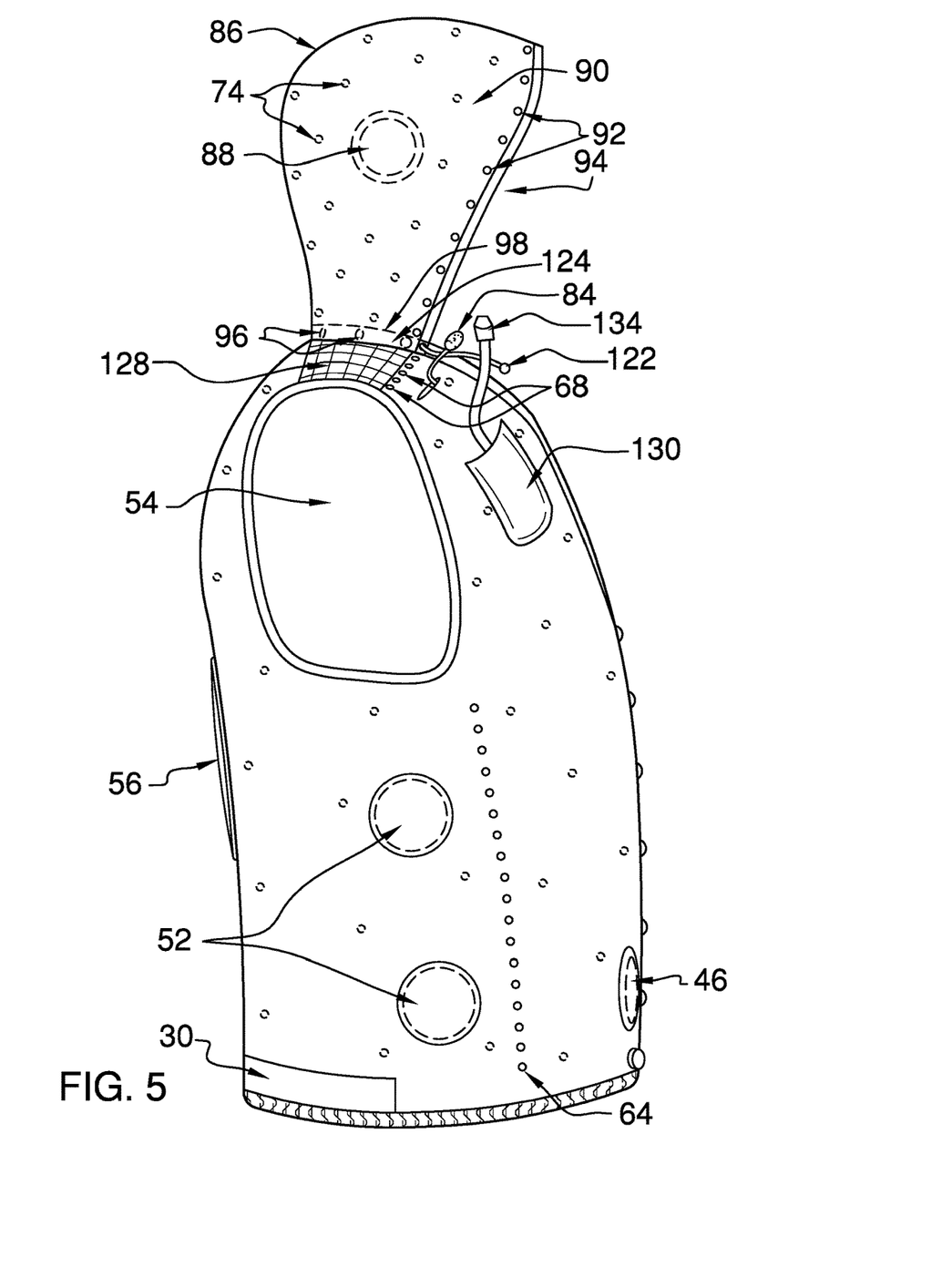
FIG. 5 is a side view of an embodiment of the disclosure.
Figure 6:
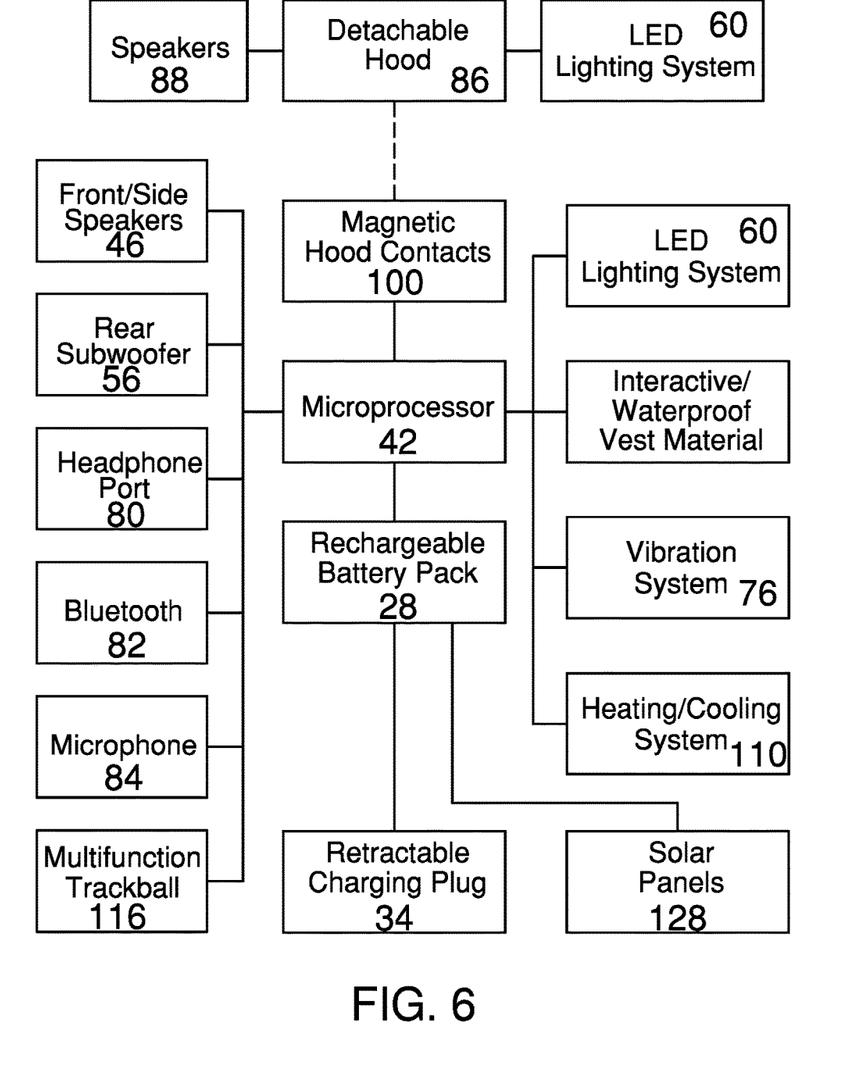
FIG. 6 is a block diagram of an embodiment of the disclosure.

With reference now to the drawings, and in particular to FIGS. 1 through 6 thereof, a new responsive garment embodying the principles and concepts of an embodiment of the disclosure and generally designated by the reference numeral 10 will be described.

As best illustrated in FIGS. 1 through 6, the sound responsive garment 10 generally comprises a shell 12. The shell 12 comprises an inner layer 14 and an outer layer 16. The shell 12 is vest shaped, such that the shell 12 is configured to cover the torso of a user. In one embodiment, the shell 12 is waterproof.

A closure 18 is positioned vertically in a front 20 of the shell 12 and extends from a neck opening 22 to a bottom 24 of the shell 12. The closure 18 is configured to open so that the user can don the shell 12 and to close to couple the shell 12 to the user. In one embodiment, the closure 18 comprises a plurality of first magnets 26.

A power module 28 is coupled to the shell 12. The power module 28 is positioned between the inner layer 14 and the outer layer 16 proximate to the bottom 24 of the shell 12. The power module 28 is rechargeable and comprises at least one battery 30. A wireless charger 32 is operationally coupled to the power module 28. The wireless charger 32 is positioned to wirelessly recharge the power module 28. A wire 34 has a first end 36 operationally coupled to the power module 28 and a second end 38 that comprises a coupler 40. The coupler 40 is configured to coupling to a power source. The wire 34 is positioned to connect the power module 28 to the power source to recharge the power module 28. In one embodiment, the wire 34 is retractable.

A microprocessor 42 is coupled to the shell 12 and operationally coupled to the power module 28. The microprocessor 42 is positioned between the inner layer 14 and the outer layer 16.

A plurality of speakers 44 is coupled to shell 12 and operationally coupled to the microprocessor 42. The speakers 42 are coupled to the outer layer 16 of the shell 12. The plurality of speakers 44 comprises a pair of front speakers 46 positioned in the front 20 of the shell 12 proximate to the bottom 24, a pair of left speakers 48 vertically arrayed between a left armhole 50 and the bottom 24 of the shell 12, a pair of right speakers 52 vertically arrayed between a right armhole 54 and the bottom 24 of the shell 12, and a subwoofer 56 substantially centrally positioned in a back 58 of the shell 12. In one embodiment, the subwoofer 56 is reversibly coupled to the shell 12.

A plurality of lights 60 is coupled to the shell 12 and operationally coupled to the microprocessor 42. The lights 60 are coupled to the outer layer 16. In one embodiment, the lights 60 comprise light emitting diodes 61. The plurality of lights 60 comprises a row of left lights 62 positioned proximate to the left speakers 48, a row of right lights 64 positioned proximate to the right speakers 52, a row of first lights 66 that extends from proximate to the neck opening 22 to proximate to the left armhole 50, a row of second lights 68 that extends from proximate to the neck opening 22 to proximate to the right armhole 54, a plurality of back lights 70 positioned in a plurality of bands 72 that extends radially from the subwoofer 56, and a plurality of field lights 74 positioned on the shell 12. In one embodiment, the plurality of bands 72 comprises six bands 72.

A plurality of vibrators 76 is coupled to the shell 12 and operationally coupled to the microprocessor 42. The vibrators 76 are positioned between the inner layer 14 and the outer layer 16. In one embodiment, the plurality of vibrators 76 comprises four vibrators 76 coupled to the back 58 of the shell 12. In another embodiment, the vibrators 76 are substantially rectangularly oriented around the subwoofer 56.

An input 78 is operationally coupled to the microprocessor 42. The input 78 is positioned on the shell 12 proximate to the neck opening 22. The input 78 comprises a headphone port 80. The input 78 comprises a Bluetooth receiver 82. In one embodiment, the input 78 comprises a microphone 84 flexibly coupled to the shell 12.

A hood 86 is reversibly couplable to the shell 12 proximate to the neck opening 22 of the shell 12. The plurality of speakers 44 comprises a pair of hood speakers 88 singly positioned substantially centrally on opposing sides 90 of the hood 86. Each hood speaker 88 is configured to be positioned proximate to a user's ear. The plurality of lights 60 comprises a line of lights 92 positioned proximate to a hood opening 94 of the hood 86. The plurality of field lights 74 comprises field lights 74 positioned in the hood 86. The hood 86 comprises a plurality of contacts 96 coupled to a lower rim 98 of the hood 86. The plurality of contacts 96 is complementary to a plurality of second magnets 100 positioned proximate to the neck opening 22 of the shell 12. The second magnets 100 are positioned to couple to the contacts 96 to couple the hood 86 to the shell 12 and to operationally couple the pair of hood speakers 88 and the field lights 74 positioned in the hood 86 to the microprocessor 42.

A plurality of pockets 102 is coupled to the inside layer of the shell 12. In one embodiment, the plurality of pockets 102 comprises two pockets 102 positioned on a front left side 104 and two pockets 102 positioned on a front right side 106 of the shell 12.

A first controller 108 is coupled to the outer layer 16 and positioned proximate to the bottom 24. The first controller 108 is operationally coupled to the power module 28. A heating/cooling unit 110 is coupled to the shell 12 and positioned between the inner layer 14 and the outer layer 16. The heating/cooling unit 110 is operationally coupled to the first controller 108. The first controller 108 is positioned to control power output to the heating/cooling unit 110 such that the heating/cooling unit 110 is adjustable to a temperature desired by the user. In one embodiment, the heating/cooling unit 110 comprises a plurality of looped elements 112 positioned between the inner layer 14 and the outer layer 16 of the shell 12. In another embodiment, the plurality of looped elements 112 comprises looped elements 112 positioned singly in the front left side 104, the front right side 106 and the back 58 of the shell 12. The first controller 108 comprises a pair of first controllers 108 coupled singly to the looped element 112 positioned in the front right side 106 and to the looped element 112 positioned in the front left side 104.

A second controller 114 is operationally coupled to the microprocessor 42. The second controller 114 is coupled to the outer layer 16 proximate to the bottom 24. The second controller 114 is configured for manipulation of the audio signal received by the microprocessor 42 from the input 78. The second controller 114 is configured to emulate the action of a disc jockey manipulating a vinyl record. In one embodiment, the second controller 114 comprises a track ball 116.

A first drawstring 118 is positioned through a first channel 120 coupled to the bottom 24 of the shell 12. The first drawstring 118 is positioned to tighten the bottom 24 around the waist of the user. A second drawstring 122 is positioned through a second channel 124 coupled proximate to the neck opening 22. The second drawstring 122 is positioned to tighten the neck opening 22 around the neck of the user.

A universal serial bus connector 126 is coupled to the shell 12 and operationally coupled to the microprocessor 42. The universal serial bus connector 126 is positioned on the shell 12 such that the universal serial bus connector 126 is configured to couple to an external device, such that data on the external device is communicated to the microprocessor 42.

A plurality of solar panels 128 is coupled to the shell 12 proximate to the neck opening 122. The solar panels 128 are operationally coupled to the power module 28. The solar panels 128 are positioned on the shell 12 such that the solar panels 128 are configured to capture sunlight to charge the power module 28.

A reservoir 130 is coupled to the shell 12 proximate to the neck opening 122. The reservoir 130 is configured to position a liquid. The reservoir 130 is positioned on the shell 12 such that the reservoir 130 is configured to fill with a liquid to hydrate the user. A tube 132 is fluidically coupled to the reservoir 130. The tube 132 is flexible, such that the tube 132 is positionable proximate to a mouth of the user. A nozzle 134 is coupled to the tube 132 distal from the reservoir 130. The nozzle 134 is configured to open upon squeezing by the mouth of the user.

The present invention also anticipates a transceiver that would be coupled to the shell 12 and operationally coupled to the microprocessor 42. The transceiver would be configured for sending and receiving wireless signals.

The present invention also anticipates a pedometer, a calorie counter, a vibration life counter and a batter display that would be selectively and operationally coupled to the microprocessor 42.

In use, the input 78 is configured to couple to an audio source such that an audio signal from the audio source is relayed to the microprocessor 42. The speakers 44 are positioned to emit the audio signal. The lights 60 and the vibrators 76 are motivated by the microprocessor 42 to emit light and vibrations, respectively, timed to the audio signal.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sound responsive garment comprising:
a shell;
a power module coupled to said shell;
a microprocessor coupled to said shell and operationally coupled to said power module;
a plurality of speakers coupled to shell and operationally coupled to said microprocessor;
a plurality of lights coupled to said shell and operationally coupled to said microprocessor;
a plurality of vibrators coupled to said shell and operationally coupled to said microprocessor;
an input operationally coupled to said microprocessor; and
wherein said input is configured to couple to an audio source of sound such that an audio signal from the audio source is relayed to said microprocessor such that said speakers are positioned to emit the audio signal producing sound and such that said lights and said vibrators are motivated by said microprocessor to emit light and vibrations, respectively, timed to the audio signal.

2. The garment of claim 1, further comprising:
said shell comprising an inner layer and an outer layer;
said microprocessor and said vibrators being positioned between said inner layer and said outer layer;
said power module being positioned between said inner layer and said outer layer proximate to a bottom of said shell;
said speakers and said lights being coupled to said outer layer of said shell;
a plurality of solar panels coupled to said shell proximate to a neck opening, said solar panels being operationally coupled to said power module, wherein said solar panels are positioned on said shell such that said solar panels are configured to capture sunlight to charge said power module;
a reservoir coupled to said shell proximate to said neck opening, said reservoir being configured for positioning a liquid, such that said reservoir is positioned on said shell such that said reservoir is configured for filling with a liquid to hydrate a user;
a tube fluidically coupled to said reservoir, said tube being flexible such that said tube is positionable proximate to a mouth of the user;
a nozzle coupled to said tube distal from said reservoir, said nozzle being configured to open upon squeezing by the mouth of the user; and
a universal serial bus connector coupled to said shell and operationally coupled to said microprocessor, such that said universal serial bus connector is positioned on said shell such that said universal serial bus connector is configured to couple to an external device, such that data on the external device is communicated to said microprocessor.

3. The garment of claim 1, further comprising:
said shell being vest shaped, wherein said shell is configured to cover a torso of a user; and
said shell being waterproof.

4. The garment of claim 2, further including a closure vertically positioned in a front of said shell and extending from a neck opening to a bottom of said shell, said closure comprising a plurality of first magnets, wherein said closure is configured for opening such that the user can don said shell, and wherein said closure is configured for closing to couple said shell to the user.

5. The garment of claim 1, further including said power module being rechargeable, said power module comprising at least one battery.

6. The garment of claim 1, further including a wireless charger operationally coupled to said power module, wherein said wireless charger is positioned to wirelessly recharge said power module.

7. The garment of claim 1, further including a wire having a first end operationally coupled to said power module and a second end comprising a coupler, said coupler being configured for coupling to a power source, wherein said wire is positioned to connect said power module to a power source for recharging said power module.

8. The garment of claim 7, further including said wire being retractable.

9. The garment of claim 2, further including said plurality of speakers comprising:
a pair of front speakers positioned in a front of said shell proximate to said bottom;
a pair of left speakers being vertically arrayed between a left armhole and said bottom of said shell;
a pair of right speakers being vertically arrayed between a right armhole and said bottom of said shell; and
a subwoofer substantially centrally positioned in a back of said shell, said subwoofer being reversibly coupled to said shell.

10. The garment of claim 9, further comprising:
said lights comprising light emitting diodes; and
said plurality of lights comprising:
a row of left lights positioned proximate to said left speakers,
a row of right lights positioned proximate to said right speakers,
a row of first lights extending from proximate to said neck opening to proximate to said left armhole,
a row of second lights extending from proximate to said neck opening to proximate to said right armhole,
a plurality of back lights positioned in a plurality of bands extending radially from said subwoofer, said plurality of bands comprising six bands, and
a plurality of field lights positioned on said shell.

11. The garment of claim 9, further including said plurality of vibrators comprising four vibrators coupled to said back of said shell, said vibrators being substantially rectangularly oriented around said subwoofer.

12. The garment of claim 4, further including said input being positioned on said shell proximate to said neck opening, said input comprising a headphone port and a Bluetooth receiver.

13. The garment of claim 12, further including said input comprising a microphone, said microphone being flexibly coupled to said shell.

14. The garment of claim 10, further comprising:
a hood reversibly couplable to said shell proximate to said neck opening of said shell;
said plurality of speakers comprising a pair of hood speakers singly positioned substantially centrally on opposing sides of said hood, wherein each said hood speaker is configured to be positioned proximate to a user's ear;
said plurality of lights comprising a line of lights positioned proximate to a hood opening of said hood, said plurality of field lights comprising field lights positioned in said hood; and
said hood comprising a plurality of contacts coupled to a lower rim of said hood, said plurality of contacts being complementary to a plurality of second magnets positioned proximate to said neck opening of said shell, wherein said second magnets are positioned to couple to said contacts to couple said hood to said shell and to operationally couple said pair of hood speakers and said field lights positioned in said hood to said microprocessor.

15. The garment of claim 1, further including a plurality of pockets coupled to an inside layer of said shell, said plurality of pockets comprising two pockets positioned on a front left side and two pockets positioned on a front right side of said shell.

16. The garment of claim 2, further comprising:
a first controller coupled to said outer layer and positioned proximate to said bottom, said first controller being operationally coupled to said power module;

a heating/cooling unit coupled to said shell and positioned between said inner layer and said outer layer, said heating/cooling unit being operationally coupled to said first controller; and wherein said first controller is positioned to control power output to said heating/cooling unit such that said heating/cooling unit is adjustable to a temperature desired by the user.

17. The garment of claim 16, further including said heating cooling unit comprising a plurality of looped elements positioned between said inner layer and said outer layer of said shell, said plurality of looped elements comprising looped elements positioned singly in a front left side, a front right side and a back of said shell, said first controller comprising a pair of first controllers coupled singly to said looped element positioned in said front right side and to said looped element positioned in said front left side.

18. The garment of claim 2, further including a second controller operationally coupled to said microprocessor, said second controller being coupled to said outer layer proximate to said bottom, said second controller being configured for manipulation of the audio signal received by said microprocessor from said input, wherein said second controller is configured to emulate the action of a disc jockey manipulating a vinyl record, said second controller comprising a track ball.

19. The garment of claim 14, further comprising:
a first drawstring positioned through a first channel coupled to said bottom of said shell, wherein said first drawstring is positioned to tighten said bottom around a waist of the user; and
a second drawstring positioned through a second channel coupled proximate to said neck opening, wherein said second drawstring is positioned to tighten said neck opening around a neck of the user.

20. A sound responsive garment comprising:
a shell, said shell comprising an inner layer and an outer layer, said shell being vest shaped, wherein said shell is configured to cover the torso of a user, said shell being waterproof;
a closure vertically positioned in a front of said shell and extending from a neck opening to a bottom of said shell, wherein said closure is configured for opening such that the user can don said shell, and wherein said closure is configured for closing to couple said shell to the user, said closure comprising a plurality of first magnets;
a power module coupled to said shell, said power module being positioned between said inner layer and said outer layer proximate to said bottom of said shell, said power module being rechargeable, said power module comprising at least one battery;
a plurality of solar panels coupled to said shell proximate to said neck opening, said solar panels being operationally coupled to said power module, wherein said solar panels are positioned on said shell such that said solar panels are configured to capture sunlight to charge said power module;
a wireless charger operationally coupled to said power module, wherein said wireless charger is positioned to wirelessly recharge said power module;
a wire having a first end operationally coupled to said power module and a second end comprising a coupler, said coupler being configured for coupling to a power source, wherein said wire is positioned to connect said power module to a power source for recharging said power module, said wire being retractable;
a microprocessor coupled to said shell and operationally coupled to said power module, said microprocessor being positioned between said inner layer and said outer layer;
a plurality of solar panels coupled to said shell proximate to said neck opening, said solar panels being operationally coupled to said power module, wherein said solar panels are positioned on said shell such that said solar panels are configured to capture sunlight to charge said power module;
a reservoir coupled to said shell proximate to said neck opening, said reservoir being configured for positioning a liquid, such that said reservoir is positioned on said shell such that said reservoir is configured for filling with a liquid to hydrate the user;
a tube fluidically coupled to said reservoir, said tube being flexible such that said tube is positionable proximate to a mouth of the user;
a nozzle coupled to said tube distal from said reservoir, said nozzle being configured to open upon squeezing by the mouth of the user;
a universal serial bus connector coupled to said shell and operationally coupled to said microprocessor, such that said universal serial bus connector is positioned on said shell such that said universal serial bus connector is configured to couple to an external device, such that data on the external device is communicated to said microprocessor;
a plurality of speakers coupled to shell and operationally coupled to said microprocessor, said speakers being coupled to said outer layer of said shell, said plurality of speakers comprising;
a pair of front speakers positioned in a front of said shell proximate to said bottom,
a pair of left speakers being vertically arrayed between a left armhole and said bottom of said shell,
a pair of right speakers being vertically arrayed between a right armhole and said bottom of said shell, and
a subwoofer substantially centrally positioned in a back of said shell, said subwoofer being reversibly coupled to said shell;
a plurality of lights coupled to said shell and operationally coupled to said microprocessor, said lights being coupled to said outer layer, said lights comprising light emitting diodes, said plurality of lights comprising:
a row of left lights positioned proximate to said left speakers,
a row of right lights positioned proximate to said right speakers,
a row of first lights extending from proximate to said neck opening to proximate to said left armhole,
a row of second lights extending from proximate to said neck opening to proximate to said right armhole,
a plurality of back lights positioned in a plurality of bands extending radially from said subwoofer, said plurality of bands comprising six bands, and
a plurality of field lights positioned on said shell;
a plurality of vibrators coupled to said shell and operationally coupled to said microprocessor, said vibrators being positioned between said inner layer and said outer layer, said plurality of vibrators comprising four vibrators coupled to said back of said shell, said vibrators being substantially rectangularly oriented around said subwoofer;
an input being operationally coupled to said microprocessor, said input being positioned on said shell proximate to said neck opening, said input comprising a headphone port, said input comprising a Bluetooth receiver, said input comprising a microphone, said microphone being flexibly coupled to said shell;

a hood reversibly couplable to said shell proximate to said neck opening of said shell;

said plurality of speakers comprising a pair of hood speakers singly positioned substantially centrally on opposing sides of said hood, wherein each said hood speaker is configured to be positioned proximate to a user's ear;

said plurality of lights comprising a line of lights positioned proximate to a hood opening of said hood, said plurality of field lights comprising field lights positioned in said hood;

said hood comprising a plurality of contacts coupled to a lower rim of said hood, said plurality of contacts being complementary to a plurality of second magnets positioned proximate to said neck opening of said shell, wherein said second magnets are positioned to couple to said contacts to couple said hood to said shell and to operationally couple said pair of hood speakers and said field lights positioned in said hood to said microprocessor;

a plurality of pockets coupled to said inside layer of said shell, said plurality of pockets comprising two pockets positioned on a front left side and two pockets positioned on a front right side of said shell;

a first controller coupled to said outer layer and positioned proximate to said bottom, said first controller being operationally coupled to said power module;

a heating/cooling unit coupled to said shell and positioned between said inner layer and said outer layer, said heating/cooling unit being operationally coupled to said first controller, wherein said first controller is positioned to control power output to said heating/cooling unit such that said heating/cooling unit is adjustable to a temperature desired by the user, said heating cooling unit comprising a plurality of looped elements positioned between said inner layer and said outer layer of said shell, said plurality of looped elements comprising looped elements positioned singly in said front left side, said front right side and said back of said shell, said first controller comprising a pair of first controllers coupled singly to said looped element positioned in said front right side and to said looped element positioned in said front left side;

a second controller operationally coupled to said microprocessor, said second controller being coupled to said outer layer proximate to said bottom, said second controller being configured for manipulation of the audio signal received by said microprocessor from said input, wherein said second controller is configured to emulate the action of a disc jockey manipulating a vinyl record, said second controller comprising a track ball;

a first drawstring positioned through a first channel coupled to said bottom of said shell, wherein said first drawstring is positioned to tighten said bottom around the waist of the user;

a second drawstring positioned through a second channel coupled proximate to said neck opening, wherein said second drawstring is positioned to tighten said neck opening around the neck of the user; and wherein said input is configured to couple to an audio source of sound such that an audio signal from the audio source is relayed to said microprocessor such that said speakers are positioned to emit the audio signal producing sound and such that said lights and said vibrators are motivated by said microprocessor to emit light and vibrations, respectively, timed to the audio signal.

* * * * *